US012629640B2

(12) United States Patent
Jin et al.

(10) Patent No.: US 12,629,640 B2
(45) Date of Patent: May 19, 2026

(54) PHOTOCURABLE COLOR CHANGING COMPOSITIONS AND METHOD OF FORMING FEATURES ON A MEMBRANE SURFACE USING THE SAME

(71) Applicant: Henkel AG & Co. KGaA, Duesseldorf (DE)

(72) Inventors: Shuhua Jin, Cheshire, CT (US); Jesse Lawrence Davis, Hartford, CT (US); Chih-Min Cheng, Westford, MA (US); Zhongwei Liu, Newington, CT (US); Daniel Yi, Glastonbury, CT (US); Tomoyo Wakamatsu, Rocky Hill, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 578 days.

(21) Appl. No.: 18/045,268

(22) Filed: Oct. 10, 2022

(65) Prior Publication Data

US 2023/0081461 A1 Mar. 16, 2023

Related U.S. Application Data

(63) Continuation of application No. PCT/US2021/025334, filed on Apr. 1, 2021.

(Continued)

(51) Int. Cl.

*B01D 63/10* (2006.01)
*B01D 63/12* (2006.01)

(Continued)

(52) U.S. Cl.

CPC ......... *B01D 63/1031* (2022.08); *B01D 63/10* (2013.01); *B01D 63/12* (2013.01);

(Continued)

(58) Field of Classification Search

CPC .............. B01D 63/1031; B01D 65/003; B01D 2313/14; B01D 2323/345; C09D 4/00; C09D 11/101

See application file for complete search history.

(56) References Cited

U.S. PATENT DOCUMENTS

| | | | |
|---|---|---|---|
| 4,842,736 | A | 6/1989 | Bray et al. |
| 7,303,675 | B2 | 12/2007 | De La Cruz |

(Continued)

FOREIGN PATENT DOCUMENTS

| | | | |
|---|---|---|---|
| CN | 104936626 | A | 9/2015 |
| CN | 107304318 | A | 10/2017 |

(Continued)

OTHER PUBLICATIONS

Schwalm, Photoinitiator—an overview, ScienceDirect Topics, Encyclopedia of Materials: Science and Technology, 2001, pp. 1-11.

(Continued)

*Primary Examiner* — Bradley R Spies
(74) *Attorney, Agent, or Firm* — Steven C. Bauman

(57) ABSTRACT

Photocurable compositions that have a color change during curing and methods of preparation and use of such compositions. More particularly, the present invention relates to photocurable compositions that that have a color change during curing and are useful for forming topographical features, e.g., spacer features, and/or fold protection coatings on a portion of a membrane surfaces, and particularly on membranes used in osmosis and reverse-osmosis applications, such as membrane filters.

11 Claims, 6 Drawing Sheets

Related U.S. Application Data

(60) Provisional application No. 63/013,185, filed on Apr. 21, 2020.

(51) Int. Cl.
*B01D 65/10* (2006.01)
*B01D 67/00* (2006.01)
*B01D 71/68* (2006.01)

(52) U.S. Cl.
CPC ......... *B01D 65/10* (2013.01); *B01D 67/0088* (2013.01); *B01D 67/009* (2013.01); *B01D 67/0097* (2013.01); *B01D 71/68* (2013.01); *B01D 2313/14* (2013.01); *B01D 2323/24* (2013.01); *B01D 2323/345* (2013.01)

(56) References Cited

U.S. PATENT DOCUMENTS

| | | | |
|---|---|---|---|
| 7,335,301 B2 | 2/2008 | Cheng | |
| 7,354,957 B2 | 4/2008 | Herlihy | |
| 7,390,610 B2 | 6/2008 | Day | |
| 7,691,557 B2 | 4/2010 | Bachmann et al. | |
| 7,799,884 B2 | 9/2010 | Herr et al. | |
| 7,875,177 B2 | 1/2011 | Haynes et al. | |
| 8,883,873 B2 | 11/2014 | Loccufier et al. | |
| 9,176,061 B2 | 11/2015 | Maandi et al. | |
| 9,278,949 B2 | 3/2016 | Loccufier | |
| 9,321,853 B2 | 4/2016 | Herlihy | |
| 9,714,355 B2 | 7/2017 | Illsley et al. | |
| 9,782,776 B2 | 10/2017 | Soskey et al. | |
| 2003/0077451 A1 | 4/2003 | Pavelka et al. | |
| 2007/0068864 A1 | 3/2007 | Cruz et al. | |
| 2014/0352534 A1* | 12/2014 | Sano ...................... | B01D 71/64 427/244 |
| 2018/0207589 A1* | 7/2018 | Martinez ............ | B01D 67/0006 |
| 2018/0269174 A1 | 9/2018 | Fathi et al. | |
| 2019/0143274 A1 | 5/2019 | Van Berchum et al. | |
| 2021/0009806 A1 | 1/2021 | Izzo et al. | |

FOREIGN PATENT DOCUMENTS

| | | | |
|---|---|---|---|
| JP | 2011523028 | A | 8/2011 |
| TW | 201437294 | A | 10/2014 |
| WO | 1996000745 | A2 | 1/1996 |
| WO | 2009060235 | A1 | 5/2009 |
| WO | 2011060152 | A2 | 5/2011 |
| WO | 2014118382 | A1 | 8/2014 |
| WO | 2018170086 | A1 | 9/2018 |
| WO | 2019191355 | A1 | 10/2019 |

OTHER PUBLICATIONS

Industrial & Life Sciences—Koch Membrane Systems, https://www.kochmembrane.com, 2022.

Membrane and Module Modification for Enhanced Spiral Wound Performance in Dairy processes, https://www.dairyfoods.com/ext/resources/images/events/Membrane-Forum/presentations/IsabelRushanaedy.pdf, 2019.

Crease Protector Technology—Parker-Hannifin Corporation, https://www.parker.com/Literature/Bioscience-Division/Seps-Lit/Sanitary/CPT%20UF-RO_dhP-NA.pdf, 2010.

Isabel Rushanaedy, Synder Filtration, "Membrane and Module Modification for Enhanced Spiral Wound Performance in Dairy Processes", 2019 Membrane Technology Forum, Session #6—Dairy Applications.

International Search Report for International PCT Patent Application No. PCT/US2021/025334 dated Jul. 26, 2021.

* cited by examiner

PHOTOCURABLE COLOR CHANGING COMPOSITIONS AND METHOD OF FORMING FEATURES ON A MEMBRANE SURFACE USING THE SAME

BACKGROUND

Field

The present disclosure relates generally to photocurable, color changing materials used for coating selected areas of membranes used in spiral wound filtration assemblies. More particularly, the present invention relates to photocurable compositions that that have a reversible color change during curing and are useful for forming topographical features, such as spacer features and/or reinforcing coatings, on selected areas of membrane surfaces, and particularly on membranes used in spiral wound filtration assemblies for reverse-osmosis applications.

Brief Description Related Technology

Curable compositions have been used widely for sealing, adhesive, coating and potting applications. In these applications polymer backbones and polymer functional groups are generally selected with reference to the specific end use application and the environment in which it is intended to be used.

In one embodiment curable compositions are disposed in spaced patterns on membrane surfaces. When cured, the composition forms spacers that separate adjacent membranes and allow liquid, such as water, to flow between the adjacent membranes. The formed curable composition patterns on a membrane have advantages over the more traditional mesh layers separators, particularly because the patterns provide less obstruction of flow and less build-up of filter debris (commonly referred to as fouling). Moreover, spacers formed of the cured composition when placed directly on the surface of the membrane may have a height reduced by 50% when compared to a conventional mesh spacer. This reduction in height is not possible with a traditional mesh spacer as it would dramatically increase feed pressure as well as pressure drop across the element. The smaller height of the printed spacers does not appear to reduce feed pressure significantly. For a given element diameter the smaller printed spacer height allows for more membrane to be rolled into an element as compared to a traditional mesh spacer. For example, in certain instances, the printed spacers allow for 7 additional leaves to be utilized, for a total of 35 leaves compared to a conventional mesh spacer construction of 28 leaves in the same 8-inch diameter element (i.e., 25% more). In other cases, 3 more leaves may be added, for a total of 10 leaves rather than the typical 7 leaves in a 4-inch diameter element (i.e., 40% more).

There are many difficulties in commercially manufacturing membranes having printed curable composition patterns, i.e. referred to herein as topographical features or spacers. The topographical feature must have a size and shape which provides sufficient spacing from the adjacent layer, balanced with a minimum coverage of the surface area of the membrane to allow maximum fluid flow through the uncovered surface.

While UV inks are capable of high aspect ratios and fast cures, they are limited by how high they can print in a single pass. Generally, many passes of curable composition deposition are required over the same area to build the heights required for membrane spacer applications, which dramatically slows the printing speed and production of the final product. Standard light cure acrylics (LCA's) or even gel LCA's are not able to meet the requirements necessary for achieving printed heights as they only support low aspect ratios. If jet printing is used the impact velocity of the curable composition when it hits the membrane further reduces the aspect ratio. Jet printing is able to double the print speeds, but at a great loss to the aspect ratio.

Polyolefin (PO) hot melt compositions with gravure printing allows very fast production speeds of printed membranes, however, it has the slowest cure speed due to cooling and can take 30 seconds or more. This requires large amounts of space to hold the moving membrane and not damage the pattern while it cools. The PO hot melt's aspect ratio is not adequate when used at the high viscosities necessary for gravure printing. Print height is limited to maximum print height possible by a single print pass because multiple prints passes are not possible using this technique. Accordingly, the aspect ratio is limited by the limited print height. Moreover, the PO hot melt process is prone to stringing and long start-up times with large membrane waste, which is very expensive in this market/application. Thus, in this market, the PO hot melt process is not an efficient process.

Given the difficulty in printing and curing a large number of cured spacers over a membrane surface it would be desirable to be able to quickly and easily check the spacer printing. It would be further desirable to check the degree of cure in the cured composition.

In another embodiment it is typical for the membrane leaf to be "creased" or "folded" at the permeate water tube, creating a membrane leaf weak point. Details of such assemblies are known and may be found in, for example, U.S. Pat. Nos. 4,842,736 and 7,303,675, the contents of each of which is incorporated by reference in their entirety.

Adhesives have been used as coatings on the folded membrane leaf areas to try and provide the membrane with improved durability at the fold area and to prevent leakage during use. In some applications the membrane assemblies receive daily cleaning with strong chlorine solutions or high temperature (70-85° C.) and high pH (11.0-12.5) solutions. Adhesives used for fold protection must be resistant to these cleaning solutions and high temperature and high pH conditions and maintain their mechanical integrity without cracking or delaminating from the membrane material.

Two types of adhesive are currently used as fold protection materials; one is two component polyurethane adhesive and the other is based on acrylate chemistry. Polyurethane possesses good flexibility and resistance to high pH/temperature environments but requires a long cure time (8 hours to days). The long cure time limits polyurethane adhesives to off-line processing in producing folded membrane pack. UV curable acrylate adhesives have been proposed for use as fold protection materials. Some acrylate adhesives are too brittle for this use. More flexible acrylate adhesives are 1) not able to achieve tack-free surface under short UV exposure, and 2) easily lose adhesive integrity, lose adhesion, and peel off the membrane under the required high temperature and pH conditions mentioned above. As a result, neither two component polyurethane adhesive nor conventional acrylate adhesives are optimal as a membrane fold protection material.

It is important to know the degree of polymerization because it is related to a cured material property such as mechanical strength, adhesion strength, non-reacted residues, and chemical resistance which may have significant effects on material biocompatibility or migration. However, it is difficult to quantitatively determine the degree of polymerization (cure) or solidification of a composition in a non-destructive manner. Neither the two-component polyurethane adhesive nor the conventional acrylate adhesive offers a quick and easy way for a user to check degree of cure of the cured adhesive on a filter.

There is a need for a photocurable composition and a process of using such composition which allows for application on membrane surfaces. It is desirable for the composition to have a reversible color change during and after curing to allow a user to quickly and easily check presence on a surface. It is desirable for a user to quickly and easily check the degree of cure of the cured composition on a surface. In some embodiments it is desirable for the photocurable composition to possess rheological properties that allow for a volume of the curable composition to substantially maintain its dimensions once applied, as well as during the removal of the template in the application of the curable composition to the membrane surface. In some embodiments it is desirable to provide a high-performance fold protection adhesive that is quickly curable and also has good flexibility and resistance to high pH/temperature environments.

SUMMARY

One aspect of the disclosure provides photocurable compositions (i.e., compositions that cure when exposed to sufficient actinic radiation) and methods of preparation and use of such compositions. The compositions exhibit a reversible color change during and after curing. The color of the cured composition changes during and after curing but can be renewed by a subsequent exposure to actinic radiation. In one aspect the color of the cured composition is indicative of the degree of cure of that composition.

Another aspect of the disclosure provides a membrane having a color changing, photocurable adhesive applied over only portions of the membrane surface. The applied adhesive can form spacers, fold protection or both.

Another aspect of the disclosure provides a reverse osmosis filter including: a fluid permeable membrane having a pattern of spacers thereon, wherein the spacers are formed from a photocurable composition that changes colors when exposed to actinic radiation and the spacers are formed by stencil printing or screen printing. Some fluids used with these membranes include water, milk products, alcohol products; and beverage products.

Another aspect of the disclosure provides a method of manufacturing a filtration membrane having curable composition disposed thereon including the steps of: providing a membrane have a first surface and an opposing second surface; and depositing a photocurable composition onto portions of the first and/or second membrane surface(s) in a defined shape and size. The cured composition exhibits a reversible color change during and after curing. The color of the cured composition changes but can be renewed by a subsequent exposure to actinic radiation. In one aspect the color of the cured composition is indicative of the degree of cure of that composition.

Another aspect of the disclosure provides a method of forming topographical features on a membrane surface including the steps of: providing a membrane surface; providing a stencil or screen over the membrane surface, the stencil or screen having openings exposing the membrane surface for receiving a curable composition; depositing one or more layers of curable composition into the stencil openings or screen openings and onto the membrane surface to form the topographical features, the openings defining an approximate shape and size of the topographical features; removing the stencil or screen to leave in place the topographical features on the membrane; and curing the curable composition, wherein a single layer of the curable composition deposited in the depositing step produces topographical features have an aspect ratio (height/width) from about 0.2 to about 2. The cured composition exhibits a color change during curing. In one aspect the color of the cured composition is indicative of the degree of cure of that composition. In another aspect the color of the cured composition changes back to about the precured color but can be renewed by a subsequent exposure to actinic radiation.

Another aspect of the disclosure provides a method of forming topographical features on a membrane surface including the steps of: providing a membrane surface; providing a stencil or screen over the membrane surface, the stencil or screen having openings exposing the membrane surface for receiving a curable composition; depositing one or more layers of a photocurable composition into the stencil openings or screen openings and onto the membrane surface to form the topographical features, the openings defining an approximate shape and size of the topographical features; and removing the stencil or screen to leave in place the topographical features on the membrane. The deposited photocurable composition is exposed to sufficient actinic radiation to cure that composition either before or after the stencil is removed. The cured composition exhibits a reversible color change during and after curing. The color of the cured composition changes but can be renewed by a subsequent exposure to actinic radiation. In one aspect the color of the cured composition is indicative of the degree of cure of that composition.

Another aspect of the disclosure provides a method of applying a color changing, photocurable adhesive to a membrane fold area.

Another aspect of the disclosure provides a method of manufacturing a filtration membrane having curable composition disposed thereon including the steps of: providing a membrane have a first surface and an opposing second surface; and depositing a photocurable composition onto portions of the first and/or second membrane surface(s) in a defined shape and size. The cured composition exhibits a reversible color change during and after curing. The color of the cured composition changes but can be renewed by a subsequent exposure to actinic radiation. In one aspect the color of the cured composition is indicative of the degree of cure of that composition.

BRIEF DESCRIPTION OF THE DRAWINGS

Referring now to the drawings wherein like elements are numbered alike in the several Figures:

FIG. 5*a* shows the stencil overlaid on the membrane surface and FIG. 5*b* shows the stencil and membrane separated from one another after the stencil has been removed from the membrane leaving the topographical features.

DETAILED DESCRIPTION

Figure 1:
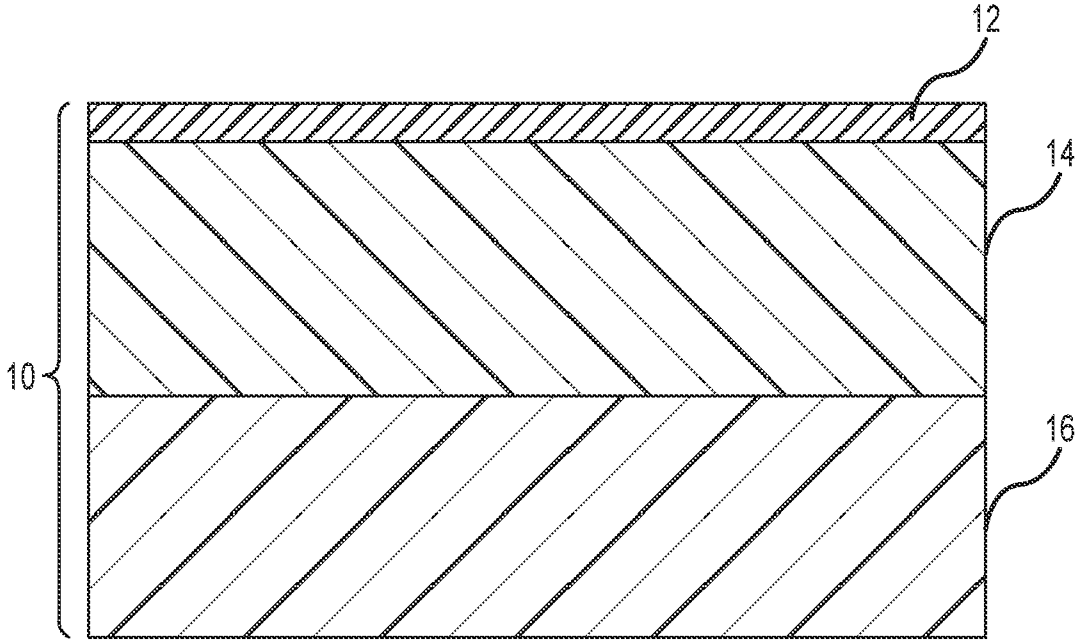
FIG. 1 is schematic, cross sectional view of a membrane.

The singular forms "a", "an" and "the" include plural referents unless the context clearly dictates otherwise.

About or "approximately" as used herein in connection with a numerical value refer to the numerical value ±10%, preferably ±5% and more preferably ±1% or less.

At least one, as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Preferred and preferably are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

Unless indicated otherwise, all percentages that are cited in connection with the compositions described herein refer to weight percent (wt. %) with respect to final composition with all components.

The molecular weights given in the present text refer to number average molecular weights (Mn), unless otherwise stipulated. Molecular weight data can be obtained by gel permeation chromatography (GPC) calibrated against polystyrene standards in accordance with DIN 55672-1:2007-08 at 35° C., unless otherwise stipulated. The weight average molecular weight Mw can be determined by GPC, as described for Mn. "Polydispersity index" refers to a measure of the distribution of molecular mass in a given polymer sample. The polydispersity index is calculated by dividing the weight average molecular weight (Mw) by the number average molecular weight (Mn).

Alkyl refers to a monovalent group that contains carbon atoms and hydrogen atoms, for example 1 to 8 carbons atoms, that is a radical of an alkane and includes linear and branched configurations. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may optionally be substituted. Preferred substituents include one or more groups selected from halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. Preferred alkyl groups include unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl).

Alkylene refers to a divalent group that contains carbon atoms, for example from 1 to 20 carbon atoms, that is a radical of an alkane and includes linear and branched organic groups, which may be unsubstituted or optionally substituted. Preferred alkylene groups include unsubstituted alkylene groups containing from 1-12 carbon atoms ($C_1$-$C_{12}$ alkylene)—for example unsubstituted alkylene groups containing from 1 to 6 carbon atoms ($C_1$-$C_6$ alkylene) or from 1 to 4 carbons atoms ($C_1$-$C_4$ alkylene).

Alkenyl group refers to an aliphatic carbon group that contains carbon atoms, for example 2 to 8 carbon atoms and at least one double bond. Like the aforementioned alkyl group, an alkenyl group can be straight or branched, and may be unsubstituted or may be optionally substituted. Examples of $C_2$-$C_8$ alkenyl groups include, but are not limited to: allyl; isoprenyl; 2-butenyl; and, 2-hexenyl.

Aryl or aromatic group used alone or as part of a larger moiety—as in "aralkyl group"-refers to unsubstituted or optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include phenyl; indenyl; naphthalenyl, tetrahydronaphthyl, tetrahydroindenyl; tetrahydroanthracenyl; and, anthracenyl.

Arylene is a bivalent aryl group and may be unsubstituted or optionally substituted.

Aralkyl refers to an alkyl group that is substituted with an aryl group. An example of an aralkyl group is benzyl.

Acrylate refers to the univalent —O—C(O)—C═C moiety. Methacrylate refers to the univalent —O—C(O)—C(CH3)═C moiety. (Meth)acrylate refers to acrylate and methacrylate.

Acryloyl (ACR) refers to a —C(O)—C═C moiety. Methacryloyl (MCR) refers to a —C(O)—C(CH3)═C moiety. (Meth)acryloyl refers to acryloyl and methacryloyl.

Alkyne or alkynyl refers to a hydrocarbon chain or group containing one or more triple bonds between the chain carbon atoms. The alkyne can be a straight hydrocarbon chain or a branched hydrocarbon group. The alkyne can be cyclic. The alkyne can contain 1 to 20 carbon atoms, advantageously 1 to 10 carbon atoms and more advantageously 1 to 6 carbon atoms. The alkyne can contain one or more triple bonds that are conjugated. In some embodiments the alkyne can be substituted.

Anhydrous means that the applicable mixture or component comprises less than 0.1 wt. % of water, based on the weight of the mixture or component.

Catalytic amount means a sub-stoichiometric amount of catalyst relative to a reactant.

Cycloalkyl refers to a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

Ester refers to the structure R—C(O)—O—R' where R and R' are independently selected hydrocarbyl groups with or without heteroatoms. The hydrocarbyl groups can be substituted or unsubstituted.

Ether refers to a compound having an oxygen atom connected to two alkyl or aryl groups.

Halogen or halide refers to an atom selected from fluorine, chlorine, bromine and iodine.

Heteroatom is an atom other than carbon or hydrogen, for example nitrogen, oxygen, phosphorus or sulfur. The expression "interrupted by at least one heteroatom" means that the main chain of a residue comprises, as a chain member, at least one heteroatom.

Hydrocarbyl refers to a group containing carbon and hydrogen atoms. The hydrocarbyl can be linear, branched, or cyclic group. The hydrocarbyl can be alkyl, alkenyl, alkynyl or aryl. In some embodiments, the hydrocarbyl is substituted.

Oligomer refers to a small number of repeating monomer units, such as 2 to 5000 units or advantageously about 5 to about 2,000 units, which have been polymerized to form a molecule. Oligomers are a subset of the term polymer. "Polymer" refers to any polymerized molecule greater in chain length and molecular weight than the oligomer. As used herein polymer may include both oligomers and polymers.

Polyether refers to a compound having more than one ether group. Exemplary polyethers include polyoxymethylene, polyethylene oxide and polypropylene oxide.

Polymerization conditions means the reaction conditions suitable to combine monomers into polymers.

Room temperature refers a temperature of about 25° C.

Substituted refers to the replacement of an atom in any possible position on a molecule by one or more substituent groups. Useful substituent groups are those groups that do not significantly diminish the disclosed reactions. Exemplary substituents include, for example, alkyl, alkenyl, alkynyl, cycloalkyl, cycloalkenyl, cycloalkynyl, aryl, aralkyl, heteroaryl, heteroalicyclyl, heteroaralkyl, heteroalkenyl, heteroalkynyl, (heteroalicyclyl)alkyl, aryloxy, acyl, ester, mercapto, alkylthio, arylthio, carbonyl, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, silyl, sulfenyl, sulfinyl, sulfonyl, haloalkoxy, trihalomethanesulfonyl, trihalomethanesulfonamido, amino including mono- and di-substituted amino groups and the protected derivatives thereof, carbamate, halogen, (meth)acrylate, epoxy, oxetane, urea, urethane, $N_3$, NCS, CN, $NO_2$, $NX^1X^2$, $OX^1$, $C(X^1)_3$, $COOX^1$, $SX^1$, $Si(OX^1)_iX^2_{3-i}$, alkyl, alkoxy; wherein each $X^1$ and each $X^2$ independently comprise H, alkyl, alkenyl, alkynyl, aryl or halogen and i is an integer from 0 to 3.

Unless indicated otherwise, all percentages that are cited in connection with the compositions described herein refer to weight percent (wt. %) with respect to final composition with all components.

In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

The present invention is directed to photocurable compositions and methods of preparation and use of such compositions on a filtration membrane. The cured composition exhibits a reversible color change during and after curing. The color of the cured composition changes but can be renewed by a subsequent exposure to actinic radiation. In some aspects the color of the cured composition is indicative of the degree of cure of that composition.

One embodiment discloses a method of forming topographical features on a membrane surface according to the present invention includes the steps of: providing a membrane surface; providing a stencil or screen over the membrane surface, the stencil or screen having openings exposing the membrane surface for receiving a curable composition; depositing one or more layers of curable composition into the stencil openings or screen openings and onto the membrane surface to form the topographical features, the openings defining an approximate shape and size of the topographical features; removing the stencil or screen to leave in place the topographical features on the membrane; and curing the curable composition.

Another method of forming topographical features on a membrane surface according to the present invention includes: the steps of: providing a membrane surface; providing a stencil or screen over the membrane surface, the stencil or screen having openings exposing the membrane surface for receiving a curable composition; depositing one or more layers of curable composition into the stencil openings or screen openings and onto the membrane surface to form the topographical features, the openings defining an approximate shape and size of the topographical features; and removing the stencil or screen to leave in place the topographical features on the membrane. In some aspects the viscosity of the curable composition is 10,000 to 500,000 centipoise (cP) at 25° C. and 10 $s^{-1}$; and/or the Thixotropic index (TI) (viscosity at 1 $s^{-1}$/viscosity at 10 $s^{-1}$) is about −1 to about 10; and/or the curable composition provides a topographical features aspect ratio (height/width) sufficient to substantially maintain the approximate size and shape of the feature during removal of the stencil from the membrane surface prior to cure.

The topographical feature forming methods of the present invention may be carried out using high speed production printing methods known in the art. Preferably, the methods of the invention employ direct printing via stencil/screen or gravure printing methods.

Figure 5A:
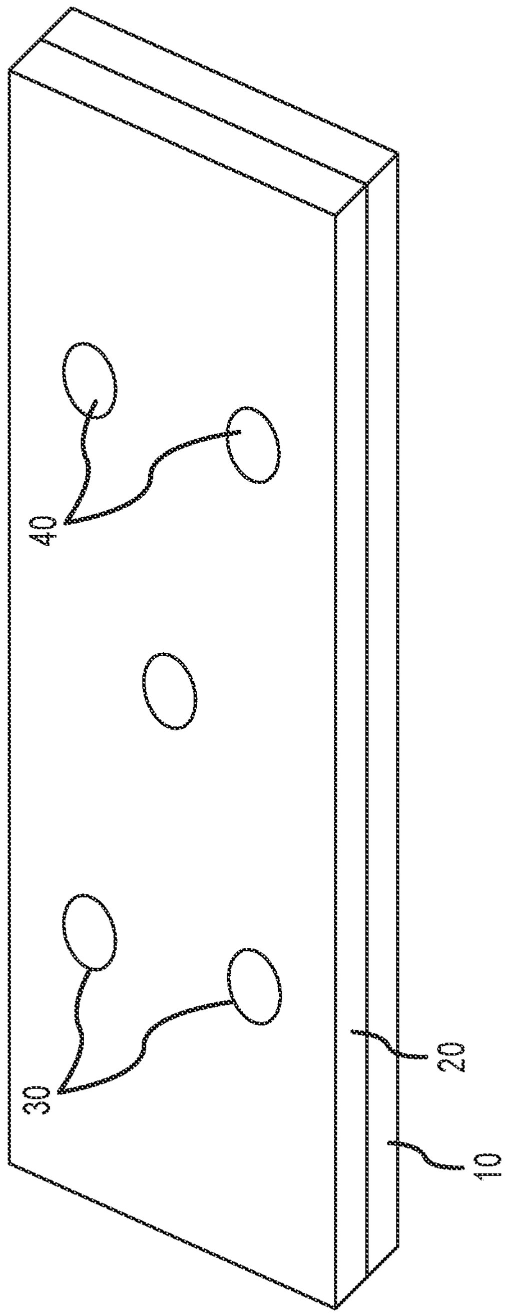
FIGS. 5*a* and 5*b* show a stencil and membrane arrangement, with openings for deposition of a curable composition, on a membrane surface, in the form of topographical features (showing three dimension) having a desired size and shape, the topographical features being sufficient to perform a spacing function when layered with other membrane surfaces. The aspect ratio (which provides for a desired spacing capability) of the features is shown.
Figure 5B:
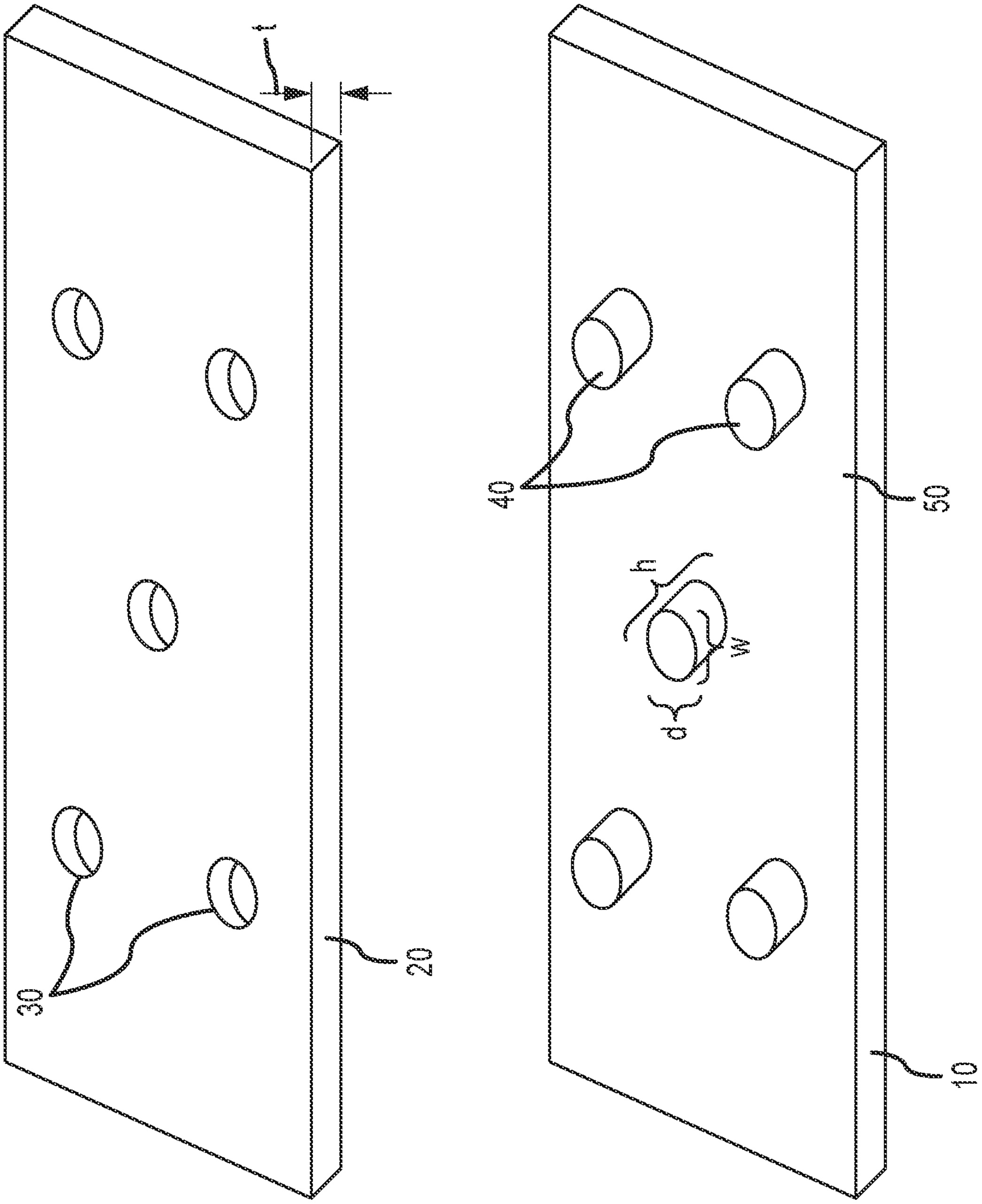

As shown in FIG. 5*a*, the membrane (10) is overlaid with the stencil (20) on one of the membrane's surfaces (not shown). The openings (30) in the stencil are filled with curable composition to form topographical features such as spacers (40). The composition is cured from the other side of the membrane. As shown in FIG. 5*b*, when the stencil (20) is removed from the membrane (10) the partially cured composition if further cured by exposure to actinic radiation to form the topographical features (40) on the membrane surface (50).

The topographic features formed on the membrane surface have physical characteristics that make them suitable for providing spacing between overlaid layers of the membrane. For example, the topographic features may provide adequate spacing between layers of a spiral reverse osmosis filtering membrane to optimize the operation, cleaning, and lifespan of reverse osmosis membrane elements employing membranes with these topographical features. Moreover, the topographical features are typically smooth or flat, with no sharp edges that may damage the mating layer of membrane during operation.

The aspect ratio of the topographical features may be greater than 0.50 or greater than about 0.70. A combination of aspect ratios may be used in a pattern to provide a specified spacing configuration between layers of membrane or other surfaces in the osmosis devices of the invention. As used herein, the term "aspect ratio" means the ratio of the height of the topographical features to the width of the topographical features.

The height of the topographical features once formed on the membrane may be from about 0.001 to about 0.05 inches, such as from about 0.01 to about 0.04 inches. The height of a topographical feature is the distance from the base of the topographical feature (on the membrane surface or the interface between the topographical feature and the membrane) to the point on the topographical feature that is farthest perpendicularly from the membrane surface.

The width of the topographical feature is defined as the minimal dimension of a topographical feature footprint on a membrane surface, wherein the footprint is area or region of coverage on the substrate surface.

The pattern of topographical features may have a size and shape sufficient to maintain adequate membrane spacing and to expose sufficient membrane surface to ensure efficient operation of the membrane. In particular, the total surface area of the membrane covered by the topographical features (i.e., area of the footprint of the individual topographical features multiplied by the number of topographical features per unit area of the membrane surface) is not more than about 20% of the surface of the membrane (i.e., at least about 80% of the membrane surface remains exposed). The total surface area of the membrane covered by the topographical features is not more than about 15%, such as not more than about 10%, or not more than about 6%, or not more than about 5%, or not more than about 3%, or note more than about 2%, or not more than about 1%.

The pattern of topographical features may be formed on the membrane surface at speeds of about 0.5 $m^2$/minute or greater. The pattern of topographical features may be formed on the membrane surface at speeds of about 1 $m^2$/minute or greater or at speeds of about 2 $m^2$/minute or greater.

The printing speed of the topographical features may also be optimized because the desired height may be achieved while only depositing a single layer of photocurable composition without adversely affecting the aspect ratio and the overall membrane efficiency (as opposed to having to coat and cure 10-20 layers of UV Ink, for example). Moreover, this single layer of deposition can also be carried out over the entire 40 inch width of the membrane simultaneously. Thus, the time for printing a single leaf is the linear rate of travel down the length of the leaf (also 40 inches). Accordingly, there is no need for travel in both the X and Y direction with multiple passes. Essentially, there is no need to deposit multiple layers of curable composition to achieve the desired height prior to curing or pre-curing on the membrane. This offers significant speed advantage over other technologies. By way of example, UV inks deposit maximum of 0.001 inch of height per pass. The processes can in the wet printing method deposit 10 times that, i.e., up to 0.010 inch per pass and the pre-cure method can deposit 40 times that, i.e., up to of 0.040 inch per pass. The processes are also capable of depositing less than the maximum heights in a single pass for full flexibility in topographical feature design.

The surface upon which the topographical features are deposited may include any surface though a membrane surface is most suitable. As used herein, a "membrane" means a selective barrier that allows passage of some substances but prevents passage of other substances. The membrane may be a filter membrane, i.e., a membrane for filtering substances out of a liquid carrier, such as water. Filter membranes include reverse osmosis membranes, forward osmosis membranes, microfiltration membranes, ultrafiltration membranes, and nanofiltration membranes. The topographical features may be printed on the active surface of the membrane, or on the non-active surface of the membrane, or both.

The photocurable composition may be deposited into and/or through the stencil or screen openings and onto the membrane surface to form the topographical features by depositing a single layer of the composition. The photocurable composition may be deposited into and/or through the stencil or screen openings and onto the membrane surface to form the topographical features by depositing multiple layers of the composition. The topographical features may be deposited on one surface (either the feed side or permeate side) or both surfaces of the membrane.

The stencil or screen may be constructed from any useful material that allows for adequate sealing of the stencil to the surface to prevent the curable composition from bleeding onto the portion of the surface covered by the stencil and also allow for removal of the stencil from the surface without damaging the surface or disturbing the deposited curable composition. The stencil or screen may be constructed from a metal, such as steel, aluminum, stainless steel, polymer coated metal, ceramic coated metal, metal fabric, composite materials, polymeric materials, such as polyester or fluoropolymers, or polymer fabric.

A stencil printing method uses a stencil made from a single sheet of material in which a pattern is cut. The stencil is mounted into a frame and may also be mounted to a frame with a mesh to provide tightness, flatness and spring. The mesh may be constructed of any suitable material, for example stainless-steel, nylon, plastic, carbon fiber, or the like. The thickness of the stencil will be the height of the feature being printed, minus the effects of gravity and physics that reduce the height by a certain factor during printing (typically about 20%). The pattern and openings size (apertures) also determine how much product can be released out of a maximum thickness stencil. A stencil with a superior surface with low surface energy will provide higher release from the stencil. The wet printing method is limited to a height about 20% lower than the stencil thickness. However, in the pre-cure method, using the stencil as a mold, the product pre-cures to the height of the stencil. Thus, the features can be released from the apertures of the stencil because the curable composition is not fully cured and due to the low surface energy coating of the stencil. After the curable composition is fully cured, the height of the features is the same as the height of the stencil.

A screen-printing method uses a stainless-steel mesh or a polyester or Nylon screen, which has an emulsion applied thereon to cover portions of the screen or mesh and expose a pattern into which the curable composition is deposited. Print thickness is dependent on the mesh thickness, mesh open area, and emulsion build-up thickness. Thickness is also affected by printer variables such as squeegee pressure and durometer, angle of attack, speed, and snap-off distance. The viscosity of screen-printing materials may vary from low to high depending on the application needs.

Figure 4:
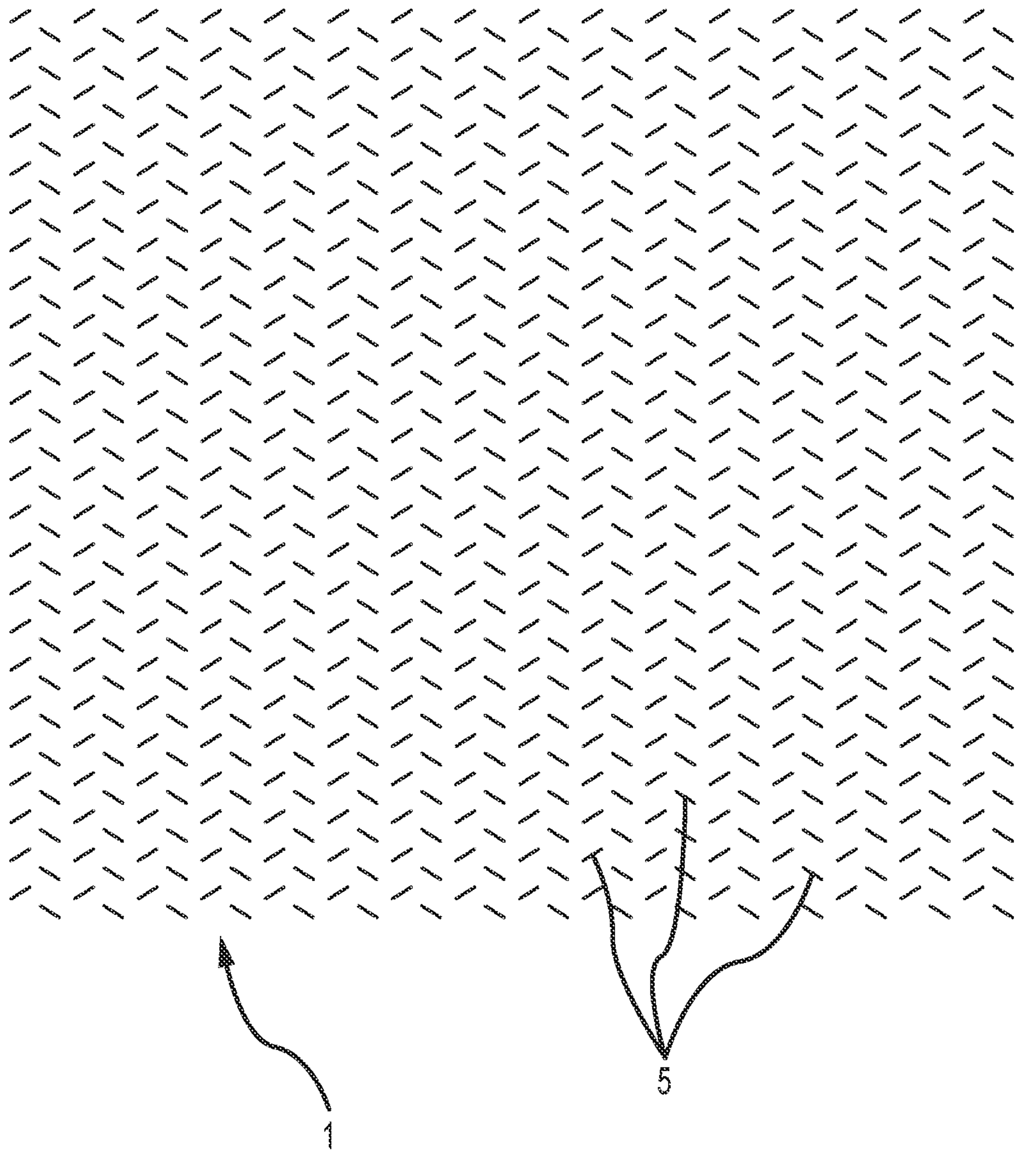
FIG. 4 depicts a typical pattern of topographical features for desalination of water or filtration of brackish water.

The openings or apertures in the stencil or screen pattern of the present invention may take any shape or combination of shapes required to produce a desired shape for the topographical features. For example, the openings may be shaped as circles, ovals, arcs, squares, rectangles, diamonds, pentagons, hexagons, stars, chevrons, or any combination thereof. Such opening shapes produce three dimensional topographical features having a cross-section corresponding to the shape(s) of the openings and having the height and aspect ratio described herein. For example, a circular opening will produce a cylindrical topographical feature. An example topographical of a feature pattern for desalination of water or filtration of brackish water is shown in FIG. 4. The depth of the stencil will determine the height of the topographical feature and is chosen for the desired height in accordance with the aspect ratios desired. For example, the heights may be from about 0.005 to about 0.04 inches and desirably about 0.010 to about 0.025 inches, more preferably from about 0.012 to about 0.015 inches.

The topographical features may be substantially free of sharp edges after formation and removal of the stencil. For example, the edges of the openings of the stencil may be free of any sharp edges so that the deposited curable composition does not have sharp edges. Moreover, when the stencil or screen is removed the curable composition does not pull up with the stencil or screen causing sharp edges on the topographical feature. Essentially, the curable composition slumps enough to maintain a rounded or flat surface, but the curable composition does not slump enough to lose the aspect ratio. In addition, the stencil coating is chosen to have low enough surface energy to avoid pulling the curable composition when the stencil or screen is removed. Thus, the topographical features are typically smooth or flat, with no sharp edges that may damage the mating layer of membrane during operation.

The curable composition in some aspects is capable of producing the thixotropic index values and/or aspect ratios as described herein, as well as being actinic radiation curable and suitable for use in the production printing methods. The curable compositions preferably have properties that make them suitable for the high speed production printing methods described herein and known in the art. For example, the curable compositions should provide for fast cure speeds, desirable rheological properties, superior adhesion, chemical/temperature resistance, and flexibility/durability to meet the various membrane application requirements. In preferred aspects cured reaction products of the composition will have a color that allows inspection of the topographical features. The color may change over time but can be renewed by a subsequent exposure to actinic radiation. In some aspects the color of the cured composition is indicative of the degree of cure of that composition.

The curable composition in this embodiment should have an optimized rheology that is effectively balanced to allow for shear thinning to flow through a screen or into the stencil printer but maintain its three dimensional print dimensions, e.g. height, width and depth (and thus maintain its overall shape), after the screen or stencil is removed to provide the aspect ratios described herein. Essentially, the curable composition of the present invention must exhibit a sufficient thixotropy to maintain its physical structure, and not run or sag, prior to cure. Moreover, when sheer force is applied (e.g., during depositing into the stencil or screen) the curable composition's viscosity is lower, which aids in the curable composition moving through/filling the openings in the stencil or screen. As used herein, "thixotropy" means that the substance becomes less viscous when stress (for example mixing or shaking) is applied and is more viscous when free of such stress (e.g., under static conditions).

Generally, the curable composition should be capable of being deposited into the stencil openings and onto the membrane surface, and once deposited and allowed to become static, capable of maintaining its shape during removal of the stencil and during curing.

In some aspects for formation of topographical features the curable composition should have a thixotropic index (TI) of from 1 to about 15, preferably from about 5 to about 10, and more preferably from about 6 to about 8. The TI should be greater than about 2, greater than about 4, greater than about 6, greater than about 7, greater than about 8, greater than about 9, greater than about 10, or greater than about 11. As used herein, the "thixotropic index" means the ratio of the viscosity (in centipoise) of the curable composition at a speed of 1 sec−1 to the viscosity (in centipoise) of the curable composition at a speed of 10 sec−1 (viscosity at 1 $s^{-1}$/viscosity at 10 $s^{-1}$).

In some aspects for formation of topographical features the curable composition should have a viscosity (in centipoise) at 25° and a speed of 10 $s^{-1}$ of about 5,000 to about 500,000 and preferably 10,000 to 50,000. The viscosity may be determined using known methods, for example, cone and plate rheometer, parallel plate rheometer, or rotation viscometer, such as Brookfield viscometer.

The curable composition may be a photocurable, i.e., curable when exposed to actinic radiation, such as visible light or ultraviolet light (UV). Thus, the curable composition may be cured using a light source, such a mercury bulb or LED that produces visible or UV light. The curable composition is at least partially cured by exposing the side of the membrane without the topographical features to the actinic radiation source.

The curable composition may be fully cured before or after the removal of the stencil or screen.

The curable composition may also be pre-cured, i.e., partially cured, prior to removal of the stencil. Here, this partial curing is produced by exposing the side of the membrane without the topographical features to a visible light source. After the removal of the stencil or screen, the curable composition may then be fully cured using a UV or visible light source.

In this pre-cure method, the viscosity of the curable composition is increased prior to removal of the stencil or screen to aid in maintaining the shape of the topographical features during removal of the stencil. In some instances, this pre-curing gels the curable composition or partially cures the curable composition to a semi-solid state. As discussed above, the stencil or screen is made from a coated metal that provides a low surface energy to allow the release of the curable composition from the stencil via the limited adhesion created to the membrane during the pre-cure.

This pre-cure method allows for dramatically improved aspect ratios over wet printing as it can achieve any height desired in one step (i.e., 0.005-0.040 inches), instead of requiring deposition of multiple layers to reach the necessary height).

In another embodiment the curable composition is coated over a portion of a membrane substrate surface and cured to form a fold protection material. With reference to the Figures, one typical membrane 10 intended for filtration use is a composite thin film sheet having a generally rectangular shape and comprised of overlying layers having the general structure shown as a schematic cross-section in FIG. 1. The membrane 10 generally comprises two or three layers: an optional thin, dense semi-permeable barrier layer 12; a microporous substrate 14; and a porous support layer 16. The thin, dense semi-permeable barrier layer 12, if used, has a typical thickness of about 0.02-0.20 micrometer. The semi-permeable barrier layer 12 is commonly, but not necessarily a polyamide film. The barrier layer 12 overlies a microporous substrate 14 having a typical thickness of about 40-50 micrometers. The microporous substrate 14 is usually but not always comprised of a polysulfone film. The microporous substrate 14 overlies a porous support layer 16 having a typical thickness of about 100-200 micrometers. The support layer 16 is generally constructed and arranged to allow filtered fluid to pass through it easily, while also providing physical support for the other layers of the composite membrane 10. One example of a porous support layer is a polyester non-woven material. The materials of construction and their thickness, etc. may be varied depending on the exact separation application for which the membrane 10 is intended to be used. If present the semi-permeable layer 12 can be an active surface of the membrane 10 to effect the separation, either on its own or in combination with the intermediate microporous substrate 14, depending on the exact nature of the compounds being separated. For instance, if the membrane 10 is intended to be used to purify water, the membrane 10 will allow water to pass through, but not contaminants such as salt.

Figure 2:
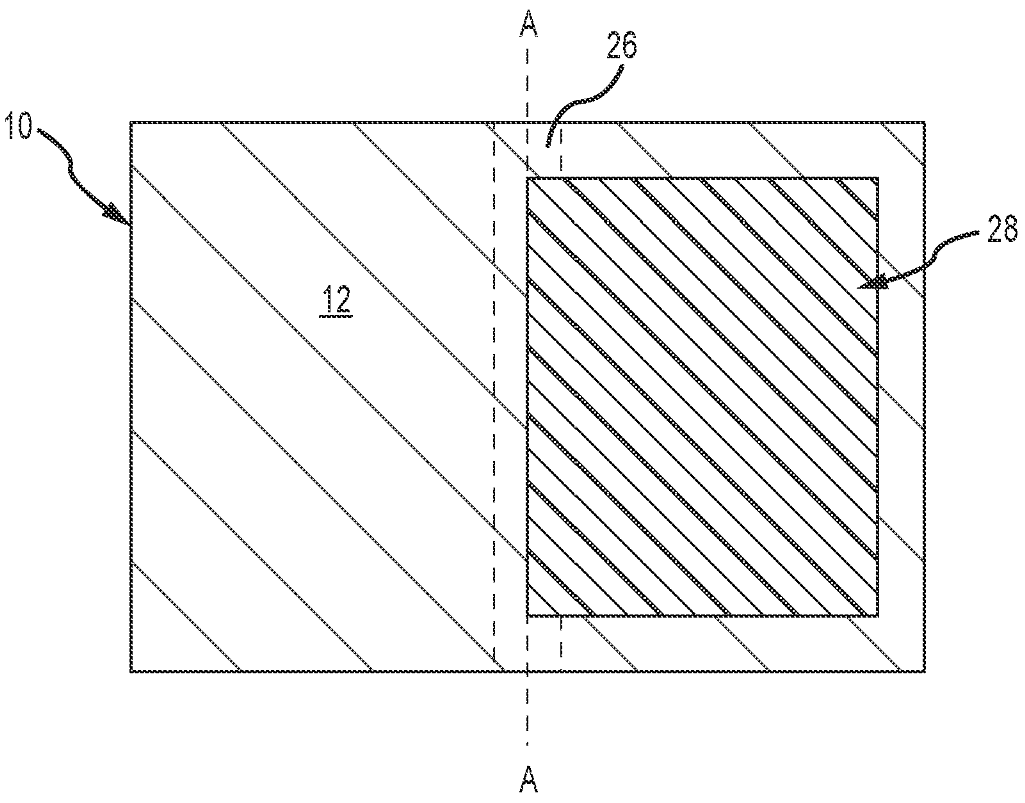
FIG. 2 is a schematic representation of a cut membrane with color changing, photocurable composition applied adjacent the fold line.

With reference to FIG. 2. the membrane 10 is cut to a desired size. A fold line A is established in the cut membrane. The curable composition 26 is mixed and applied to the membrane 10 adjacent the fold line A. The curable composition 26 can be applied adjacent the fold line A on the semi-permeable layer 12 surface, the support layer 16 surface or both. Application of the curable composition 26 can be done by established methods. The applied mixture of curable composition 26 is exposed to actinic radiation to initiate a cure. After the curable composition 26 is cured, feed spacer material 28 can be placed on a surface, typically on the semi-permeable layer 12 surface, of the cut membrane 10. In one variation the feed spacer material 28 is not used and is replaced by spacers (not shown) printed on the membrane surface using the curable composition 26.

Figure 3:
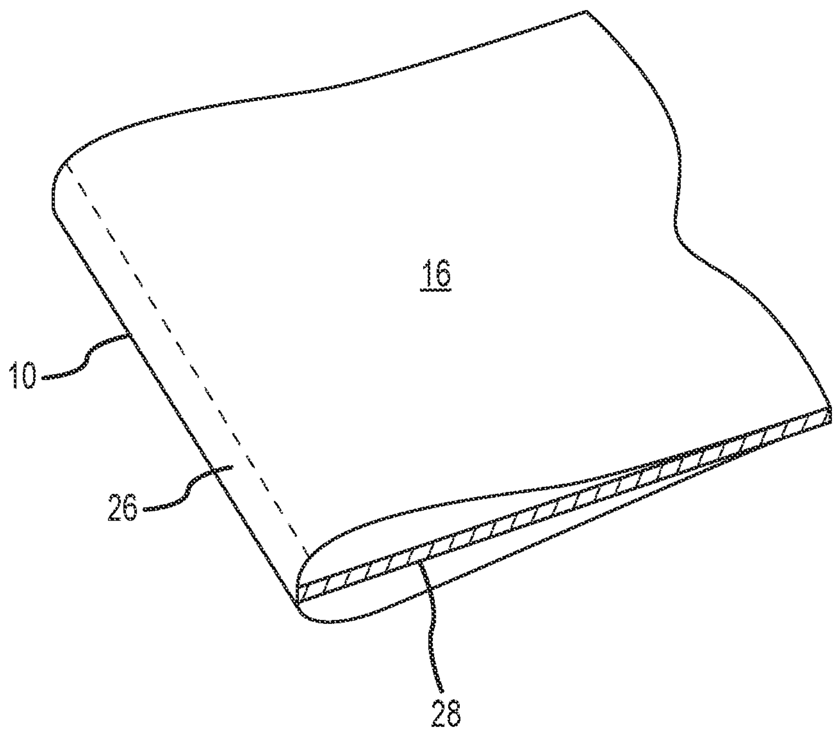
FIG. 3 is a schematic representation of a cut membrane folded around a feed spacer.

With reference to FIG. 3, the cut membrane 10 is folded along the fold line A with the feed spacer material 28 is disposed between the adjacent surfaces of the folded membrane. The cured composition 26 reinforces the membrane 10 along the fold line A. The membrane 10, cured composition 26, feed spacer 28 combination is used as a subassembly in a spiral wound filter such as used in a used in filtration assemblies.

The photocurable composition typically comprises an actinic radiation curable (meth)acrylate oligomer or polymer; a diluent; a polymeric thioxanthone photoinitiator; an amine co-initiator; filler and optional additives.

(Meth)Acrylate Oligomer

In one embodiment the backbone of the (meth)acrylate oligomer is formed from various monofunctional (meth) acrylate monomers, such as homopolymers of monofunctional $C_{1-10}$ alkyl (meth)acrylates and copolymers of monofunctional $C_{1-10}$ alkyl (meth)acrylates. Among the particularly useful monomers used include ethyl acrylate, methoxyethyl acrylate, n-butyl acrylate and homopolymers and copolymers thereof. As additional examples of useful monomers, there are included (meth)acrylic monomers such as (meth)acrylic acid, methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth) acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth) acrylate), phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, gamma-(methacryloxypropyl) trimethoxysilane, (meth) acrylic acid-ethylene oxide adduct, trifluoromethylethyl (meth)acrylate, 2-trifluoromethylethyl (meth)acrylate, 2-perfluoromethylethyl (meth)acrylate, 2-perfluoroethyl-2-perfluorobutylethyl (meth)acrylate, 2-perfluoroethyl (meth) acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, etc.; styrenic monomers such as styrene, vinyltoluene, alpha-methylstyrene, chlorostyrene, styrenesulfonic acid and its salt; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecyclmaleimide, stearylmaleimide phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride and allyl alcohol. These monomers may be used singly or a plurality of them may be copolymerized.

Additionally, the backbone of the (meth)acrylate oligomer may be formed from or include one or segments or units of polyurethane, styrene, polyolefin, acrylamide, nylon, (meth) acrylonitrile and/or substituted (meth)acrylonitrile. Useful (meth)acrylate functionalized urethanes include tetramethylene glycol urethane acrylate oligomer and a propylene glycol urethane acrylate oligomer. Other (meth)acrylate-functionalized urethanes are urethane (meth)acrylate oligomers based on polyethers or polyesters, which are reacted with aromatic, aliphatic, or cycloaliphatic diisocyanates and capped with hydroxy acrylates. Some useful examples include difunctional urethane acrylate oligomers, such as a polyester of hexanedioic acid and diethylene glycol, terminated with isophorone diisocyanate, capped with 2-hydroxyethyl acrylate; a polypropylene glycol terminated with tolyene-2,6-diisocyanate, capped with 2-hydroxyethylacrylate; a polyester of hexanedioic acid and diethylene glycol, terminated with 4,4'-methylenebis(cyclohexyl isocyanate), capped with 2-hydroxyethyl acrylate; a polyester of hexanedioic acid, 1,2-ethanediol, and 1,2 propanediol, terminated with tolylene-2,4-diisocyanate, capped with 2-hydroxyethyl acrylate; a polyester of hexanedioic acid, 1,2-ethanediol, and 1,2 propanediol, terminated with 4,4'-methylenebis(cyclohexyl isocyanate, capped with 2-hydroxyethyl acrylate; and a polytetramethylene glycol ether terminated with 4,4'-methylenebis(cyclohexylisocyanate), capped with 2-hydroxyethyl acrylate. Still other (meth)acrylate-functionalized urethanes are monofunctional urethane acrylate oligomers, such as a polypropylene terminated with 4,4'-methylenebis(cyclohexylisocyanate), capped with 2-hydroxyethyl acrylate and 1-dodosanol. (Meth)acrylate-functionalized urethanes also include difunctional urethane methacrylate oligomers such as a polytetramethylene glycol ether terminated with tolulene-2,4-diisocyanate, capped with 2-hydroxyethyl methacrylate; a polytetramethylene glycol ether terminated with isophorone diisocyanate, capped with 2-hydroxyethyl methacrylate; a polytetramethylene glycol ether terminated with 4,4'-methylenebis(cyclohexylisocyanate), capped with 2-hydroxyethyl methacrylate; and a polypropylene glycol terminated with tolylene-2,4-diisocyanate, capped with 2-hydroxyethyl methacrylate. In some embodiments polyether urethane acrylate oligomers are preferred over other oligomer types as they provide increased flexibility to the cured coating as well as increased chemical resistance, temperature resistance and pH resistance to the cured coating.

The number average molecular weight (Mn) of the (meth) acrylate oligomer may be 1000 to 100,000, more desirably 2000 to 50,000.

The (meth)acrylate oligomer can be prepared using standard techniques known in the art, or obtained from suitable commercial sources. Preparation techniques include controlled radical polymerization processes, including Single Electron Transfer Living Radical Polymerization (SET-LRP), by stable free radical polymerization (SFRP) such as reversible deactivation by coupling, or by degenerative transfer (DT). Once the polymerization is complete, the method may include further reacting the resultant polymer to form functional end groups onto the polymer. Forming functional ends on the polymer may be done, for example, by performing either an end-capping reaction or a substitution reaction.

Diluent

The curable composition can optionally include at least one diluent or reactive diluent. Useful diluents can comprise monofunctional and polyfunctional (meth)acrylates. Illustrative examples of useful (meth)acrylates, include alkyl (meth)acrylates, cycloalkyl (meth)acrylates, alkenyl (meth) acrylates, heterocycloalkyl (meth)acrylates, heteroalkyl methacrylates, alkoxy polyether mono (meth)acrylates.

The alkyl group on the (meth)acrylate desirably may be a substituted or unsubstituted alkyl group having 1 to 20 carbon atoms, desirably 1 to 10 carbon atoms, optionally having at least one substituent selected from an alkyl group having 1 to 10 carbon atoms, substituted or unsubstituted cycloalkyl group having 1 to 20 carbon atoms, desirably 1 to 10 carbon atoms, substituted or unsubstituted bicyclo or tricycloalkyl group having 1 to 20 carbon atoms, desirably 1 to 15 carbon atoms, an alkoxy group having 1 to 10 carbon atoms, an aryloxy group having 6 to 10 carbon atoms.

The alkenyl group on the (meth)acrylate desirably may be a substituted or unsubstituted alkenyl group having 2 to 20 carbon atoms, desirably 2 to 10 carbon atoms, optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

The heterocyclo group on the (meth)acrylate desirably may be a substituted or unsubstituted heterocyclo group having 2 to 20 carbon atoms, desirably 2 to 10 carbon atoms, containing at least one hetero atom selected from N and O, and optionally having at least one substituent selected from an alkyl group having 1 to 10 carbon atoms, an alkoxy group having 1 to 10 carbon atoms, an aryloxy group having 6 to 10 carbon atoms, or an epoxy group having 2 to 10 carbon atoms.

The alkoxy polyether mono (meth)acrylates can be substituted with an alkoxy group having 1 to 10 carbons and the polyether can have 1 to 10 repeat units.

Some exemplary (meth)acrylate monomers include, but are not limited to, meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, tolyl (meth) acrylate, benzyl (meth)acrylate, 2-methoxyethyl (meth) acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adduct, trifluoromethylethyl (meth)acrylate, 2-trifluoromethylethyl (meth) acrylate, 2-perfluoromethylethyl (meth)acrylate, 2-perfluoroethyl-2-perfluorobutylethyl (meth)acrylate, 2-perfluoroethyl (meth)acrylate, perfluoromethyl (meth) acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate. In an aspect of the present invention, the (meth)acrylate monomer is polyethylene glycol diacrylate, such as SR 259 (polyethylene glycol (200) diacrylate from Sartomer). Some useful multifunctional (meth)acrylates include, for example, polyethylene glycol di(meth)acrylates, desirably triethyleneglycol di(meth)acrylate, hydroxypropyl (meth)acrylate, bisphenol-A di(meth)acrylates, such as ethoxylated bisphenol-A (meth)acrylate ("EBIPA" or "EBIPMA"), and tetrahydrofuran (meth)acrylates and di(meth)acrylates, citronellyl acrylate and citronellyl methacrylate, hexanediol di(meth)acrylate ("HDDA" or "HDDMA"), trimethylol propane tri (meth)acrylate, tetrahydrodicyclopentadienyl (meth)acrylate, ethoxylated trimethylol propane triacrylate ("ETTA"), triethylene glycol diacrylate and triethylene glycol dimethacrylate ("TRIEGMA").

Photoinitiator and Co-Initiator

The curable composition includes at least one polymeric thioxanthone derivative as a photoinitiator and at least one aromatic tertiary amine as a co-photoinitator.

Polymeric thioxanthone photoinitiators, when exposed to sufficient amounts of actinic radiation will initiate and induce curing of the curable composition. Useful polymeric thioxanthone derivative photoinitiators include Genopol TX (formula below), available from Rahn;

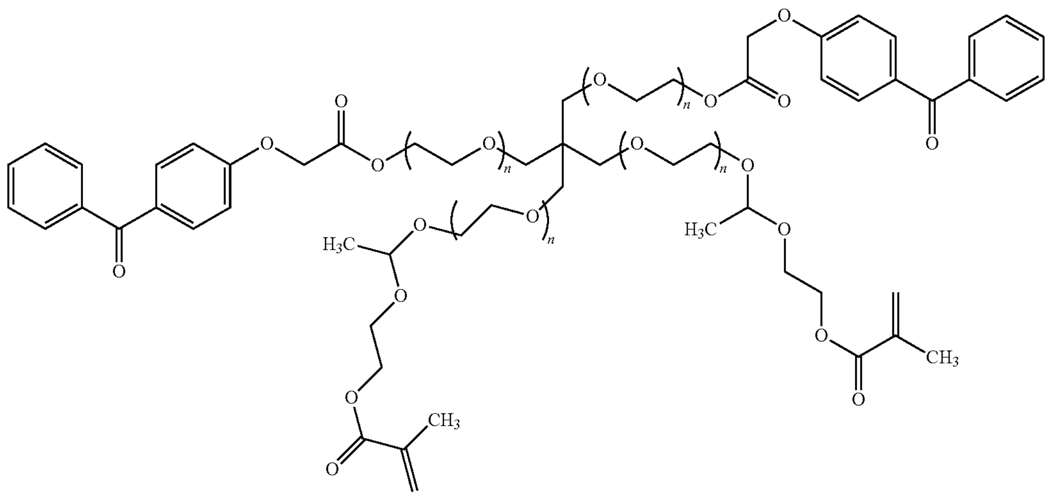

OMNIPOL TX (Formula Below) Available from IGM;

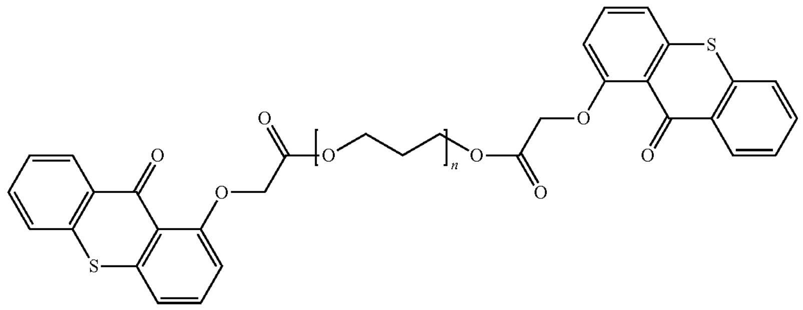

and SPEEDCURE 7010-L available from Lambson. Other photoinitiators are described in U.S. Pat. Nos. 9,278,949, 8,883,873, 7,354,957 and International Patent Publication Number WO2009060235, the contents of each of which is included by reference herein. Photoinitiators may be employed in amounts of about 0.1% to about 5% by weight of the total composition. More desirably, the photoinitiator is present in amounts of 1.0% to about 4% by weight of the total composition.

Useful co-photoinitiators that respond to UV radiation to initiate and work with the photoinitiator to induce curing of the curable composition include, but are not limited to, aromatic tertiary amines such as ethyl-4-dimethylaminobenzoate Genocure EPD, Ethyle-4-dimethylaminobenzoate, polymeric aminobenzoate derivatives such as Genopol AB-2, Omnipol ASA, amine acrylate such as Genomer 5142, Genomer 5161, 5271, 6275 and 5695, Photomer 4250, 4771, 4775, 4780, 4967 and 5006. One useful co-photoinitiator is Genopol AB-2 available from Rahn. Co-photoinitiators may be employed in amounts of about 0.1% to about 5% by weight of the total composition. More desirably, the photoinitiator is present in amounts of 1.0% to about 4% by weight of the total composition.

Filler

The curable composition can optionally include at least one type of filler. Suitable fillers can be organic or inorganic. Some useful fillers include, for example, lithopone, zirconium silicate, diatomaceous earth, calcium clay, hydroxides such as hydroxides of calcium, aluminum, magnesium, iron and the like, carbonates such as carbonates of sodium, potassium, calcium, magnesium and the like, metal oxides such as metal oxides of calcium, zinc, magnesium, chromium, zirconium, aluminum, titanium, iron and silicon. Another useful filler is silica. The silica may be a fumed silica, which may be untreated, such as AEROSIL R 8200 available from Degussa, or treated with an adjuvant, for example HDK2000 available from Wacker-Chemie. Fillers may be employed in amounts of about 5.0% to about 50% by weight of the total composition. More desirably, filler is present in amounts of 15.0% to about 40% by weight of the total composition. Organic fillers such as polymer powders or fibers can also be used. Combinations of different fillers may also be useful.

Additives

The curable composition can optionally include one or more additives. Optional additives include, for example, stabilizer, inhibitor, oxygen scavenging agent, dye, colorant, pigment, adhesion promoter, plasticizer, toughening agent, reinforcing agent, fluorescing agent, wetting agent, antioxidant, rheology modifier, thermoplastic polymer, tackifier, diluent, reactive diluent and combinations thereof. The curable composition can also be free of any or all of these additives.

In some embodiments the photocurable color changing compositions have formulations falling in one or more of the following ranges.

| | broad range (wt. %) | preferred typographical feature range (wt. %) | preferred fold coating range (wt. %) |
|---|---|---|---|
| (meth)acrylate oligomer | 20-60 | 25-45 | 30-50 |
| diluent | 10-60 | 20-50 | 30-40 |
| photoinitiator | 0.1-5 | 0.5-4.5 | 1-4 |
| co-initiator | 0.1-5 | 0.5-4.5 | 1-4 |
| filler | 0-60 | 5-50 | 15-40 |
| additive | 0-20 | 0-15 | 0-10 |

In some embodiments the photocurable color changing compositions have the following properties.

| | range | preferred range |
|---|---|---|
| Color change | Light orange-dark orange | Light orange-dark orange |
| Degree of polymerization (%) | 60-100 | 80-95 |

The compositions develop a color when cured by exposure to actinic radiation. In some embodiments the color changes and fades as the cured composition is stored in the absence of actinic radiation. If the cured composition with faded color is subsequently exposed to actinic radiation of about 405 nm the original cured color will reappear. This color change appears to be repeatable.

The color change during curing can be used to evaluate the degree of cure of the cured composition. If the composition is used to form topographical features such as spacers or fold protection the color change of the formed feature allows a manufacturer to quickly check the degree of cure of that feature. Typically membranes are stored after manufacture of the sheet and shipped to a processor to be formed into a filtration assembly. The processor can expose the received membrane sheet to actinic radiation to quickly check the presence of the features and the degree of cure. This ability is an improvement on conventional curable compositions that require sophisticated and expensive test regimens to evaluate the state of cure.

In some embodiments the curable composition, once cured, should not delaminate from the membrane surface or lose integrity when submerged in an aqueous solution at a pH range of about 12.5 at temperatures of about 80° C. for 24 hours to 14 days.

In some embodiments the curable composition should be capable of forming and maintaining topographical surface features having an aspect ratio (height/width) of greater than about 0.5 prior to cure.

In some embodiments there is provided a reverse osmosis filter including a fluid permeable membrane having a pattern of curable composition spacers printed thereon, where the curable composition spacers are formed from the disclosed light curable composition having a viscosity of 5,000 to 500,000 centipoise (cP), preferably 10,000 to 50,000 cP, at 10 $s^{-1}$ and/or a Thixotropic Index (TI) (viscosity at 1 $s^{-1}$/viscosity at 10 $s^{-1}$), of between about 1 and about 15; and/or one or more spacer layers having an aspect ratio (height/width) between about 0.2 and about 2.

In some embodiments there is provided a method of manufacturing a filtration membrane having printed curable composition spacers including the steps of providing a membrane have a first surface and an opposing second surface; and depositing a color changing radiation curable composition onto the first and/or second membrane surface (s) to form spacer features having a defined shape and size; wherein the radiation curable composition has viscosity of 5,000 to 500,000 centipoise (cP) at 10 $s^{-1}$; and/or a Thixotropic Index (TI) (viscosity at 1 $s^{-1}$/viscosity at 10 $s^{-1}$) of between about 1 and about 15; and/or an aspect ratio (height/width) of the curable composition is between about 0.2 and about 2.

EXAMPLES

List of materials used in the Examples.

| Name | Category | Supplier |
|---|---|---|
| BR582E8 | polyether urethane acrylate | Dymax |
| CN301 | polybutadiene dimethacrylate | Sartomer |
| Aerosil R202 | hydrophobic fumed silica surface-treated with polydimethylsiloxane | Evonik |
| BR582E8 | aliphatic polyether urethane acrylate oligomer | Dymax |
| CN301 | polybutadiene dimethacrylate | Sartomer |
| CN991 | polyester urethane acrylate | Sartomer |
| Ebecryl 230 | polyester urethane acrylate | Allnex |
| Ebecryl 8800-20R | aliphatic urethane acrylate oligomer diluted with reactive diluents | Allnex |
| Ebecryl 8807 | aliphatic urethane diacrylate oligomer | Allnex |
| Ebecryl 8808-20R | aliphatic urethane diacrylate oligomer | Allnex |
| Genomer 4230 | polyether urethane acrylate | Rahn |
| Genomer 1122 | urethane acrylate monomer | Rahn |
| IBOA | isobornyl acrylate | |
| RC300 | polybutyl acrylate | Kaneka |
| SR508 | dipropylene glycol diacrylate monomer | Sartomer |
| SR259 | polyethylene glycol diacrylate monomer | Sartomer |
| SR339 | 2-phenoxyethyl acrylate monomer | Sartomer |
| SR602 | ethoxylated bisphenol A diacrylate oligomer | Sartomer |
| Omnirad TPO-L | phosphine oxide photo initiator | IGM |
| Omnirad 819 | phosphine oxide photo initiator | IGM |
| Genopol TX-2 | polymeric thioxanthone photoinitiator | Rahn |
| Genopol AB-2 | polymeric amine co-photoinitiator | Rahn |
| Genocure ITX | polymeric thioxanthone photoinitiator | Rahn |
| Omnipol ITX | polymeric thioxanthone photoinitiator | IGM |
| Speedcure 7010-L | polymeric thioxanthone photoinitiator | Lambson |

Sample preparation: samples were placed on top of a polyethylene film. The material was spread across the film using a draw down bar at a height of 50 mil to create a sample having a thickness of 50 mil (2.27 mm).

Sample cure: The uncured 50 mil sample was cured using one of the following curing light units: Loctite LED 405 nm flood, Loctite LED 375 nm flood and Loctite UV LOC 1000 chamber with mercury arc lamp. Sample curing time for each light was 30s. After curing the sample was then removed from the polyethylene film for evaluation.

The curing light intensity for each curing unit is shown below. Intensity of the LOCTITE LED 405 nm flood was measured using a UV V radiometer. Intensity of the LOCTITE LED 375 nm flood was measured using a UV BA radiometer. Intensity of the LOCTITE UV LOC 1000 chamber was measured using a UV Power Puck II.

| Curing light | Light wavelength range | Light intensity mW/$cm^2$ |
|---|---|---|
| LED 405 nm | 405 nm | 198 |
| LED 375 nm | 375 nm | 230 |
| UV LOC 1000 | UVA | 86 |
| | UVB | 91 |
| | UVC | 21 |
| | UVV | 59 |
| | Total intensity | 257 |

Testing Methods

The following testing methods were employed in the examples described below.

Viscosity and Thixotropic Index

Viscosities were measured at shear rate 1 $s^{-1}$ and 10 $s^{-1}$ using cone and plate rheometer (Anton Paar). Thixotropic index was calculated as the ratio of viscosities at 1 $s^{-1}$ and 10 $s^{-1}$.

Chemical Resistance-Adhesion Loss

Membrane samples, each coated on one surface with cured reaction products of one of the samples, were immersed in a high pH aqueous solution and placed in a temperature-controlled oven. The coated samples were observed. Any visible delamination of the adhesive from the membrane surface or dissolution of the cured adhesive in the solution was graded as a fail.

Bend Test

Bend adhesion was tested by a bend test. The test involves coating one or both surfaces of a membrane with the adhesive composition. The membrane used was a commercially available and cut to a 3"×3" sample size. A coating of the sample material was applied to the surface(s) of the membrane at a thickness of about 0.2-0.3 mm and cured.

UV curing was tested by exposing a sample to UV light having a wavelength of 405 nm for 10 seconds at 0.844 W/$cm^2$, on each side of the membrane for a total energy per side of 7.85 J/$cm^2$ After curing sample surface was immediately tested for tackiness by feel. The coated membrane is folded a first time so that the cured coating is internal to the bend, returned to the flat starting position and folded a second time so that the cured coating is external to the bend. Samples were considered pass if no cracks or delamination of the cured coating from the membrane was observed.

Shore D Hardness

Shore D Hardness was measured per ASTM D2240. The tested material was placed between two PE films and covered with two glass plates to form 1 mm thick sheet, and then was cured using LED light with an intensity of 1.5 W/$cm^2$ on both sides of the glass plate. The cured sheet was then cut into 4 pieces and then stacked to be measured by Shore durometer.

Color Change Evaluation

The tested material was placed between two PE films and covered with two glass plates to form 1 mm thick sheet, and then was cured using LED light with an intensity of 1.5 W/$cm^2$ on top side of the glass plate. Cured samples were evaluated by 1) visual color observation, and 2) color measurement in L, a, b values. The L, a, b values were measured using a Datacolor apparatus available from Datacolor Corporation, in compliance with ASTM D1003.

Degree of Polymerization

The degree of polymerization (or cure) test is performed by FTIR, typically with an ATR accessory. Once the IR spectra are obtained, the relative degree of cure is calculated using the integrated peak area of the C═C peaks with the C═O peaks as an internal standard. The equation is as follows:

$$\text{Degree of polymerization (\%)}=(A0-A1)/A0\times 100$$

Where A0 is the ratio of the area of the C═C peak to the area of the C═O peaks of the uncured sample and A1 is the ratio of the area of the same two peaks of the spectra of the cured samples.

Comparative Example 1 Photocurable Formulations Using Phosphine Oxide as Photoinitiators In this example, photocurable acrylate formulations without thioxanthone derivatives are shown in the following Table. Visible photo initiators used are phosphine oxide based ones Omnirad TPO-L and Omnirad 819.

Photocurable Formulations Using Phosphine Oxide Photoinitiator

| | Composition | |
|---|---|---|
| | A | B |
| Ebecryl 8807 | 45 | 45 |
| SR 259 | 48 | 48 |
| Omnirad TPO-L | 2 | — |
| Omnirad 819 | — | 2 |
| Aerosil R202 | 5 | 5 |
| total (wt. %) | 100 | 100 |

Compositions A and B are cured using all the three curing light units for 30 seconds. Color was evaluated by visual appearance and recorded in the following Table.

Color Change after Light Curing

| | UV A chamber | LED 405 nm flood | LED 375 nm flood |
|---|---|---|---|
| A | Light yellow | Light yellow | Light yellow |
| B | Light yellow | Light yellow | Light yellow |

Compositions using phosphine oxide visible photoinitiators turned light yellow after curing exposure in any of the LED 405 nm, 375 nm or mercury arc lamp light. After exposure each sample was stored at room temperature for 24 hrs. The light yellow color remained after 24 hours. No further color change was observed after further exposure to UV/visible light.

Example 2

Photocurable compositions comprising polymeric thioxanthone photoinitiator Genopol TX-2 and different acrylate oligomers and monomers were prepared as shown below. All amounts are in wt. %. All compositions were cured using a 405 nm LED flood. Color was evaluated by visual appearance and recorded.

| | Composition | | | | |
|---|---|---|---|---|---|
| | 1 | 2 | 3 | 4 | 5 |
| EB8808-20R | 98 | 0 | 0 | 0 | 0 |
| CN301 | 0 | 98 | 0 | 0 | 0 |
| RC300 | 0 | 0 | 98 | 0 | 0 |
| CN991 | 0 | 0 | 0 | 98 | 0 |
| BR582E8 | 0 | 0 | 0 | 0 | 98 |
| Genopol TX-2 | 2 | 2 | 2 | 2 | 2 |
| total (wt. %) | 100 | 100 | 100 | 100 | 100 |
| color after cure | orange | light orange | light yellow | orange | orange |

| | Composition | | | | |
|---|---|---|---|---|---|
| | 6 | 7 | 8 | 9 | 10 |
| Genomer 4230 | 98 | 0 | 0 | 0 | 0 |
| Genomer 1122 | 0 | 98 | 0 | 0 | 0 |
| SR508 | 0 | 0 | 98 | 0 | 0 |
| SR339 2-phenoxyethyl Acrylate | 0 | 0 | 0 | 98 | 0 |
| SR 602 EO 10 BPA DA | 0 | 0 | 0 | 0 | 98 |
| Genopol TX-2 | 2 | 2 | 2 | 2 | 2 |
| total (wt. %) | 100 | 100 | 100 | 100 | 100 |
| color after cure | orange | orange | light yellow | light yellow | light yellow |

All of samples 1-10 were light yellow to light brown before cure.

All of compositions 1-10 were cured using 405 nm LED flood. Color was evaluated by visual appearance and recorded.

Formulations 1, 4, 5 and 6 comprising urethane acrylate and the polymeric photoinitator Genopol TX-2 have an orange color after curing (LED 405 nm light).

Formulations 2 and 3 containing non-urethane acrylate oligomers and the polymeric photoinitator Genopol TX-2 have a light orange color or a light yellow color after curing (LED 405 nm light).

Formulations 8, 9 and 10 containing non-urethane linkage monomers and the polymeric photoinitator Genopol TX-2 have a light orange color or a light yellow color after curing (LED 405 nm light).

In all of the above formulations the color surprisingly faded after storing the cured material at room temperature for 24 hrs. Further surprisingly, the color reappears when the cured sample is exposed to 405 nm light again.

In the following Table a polymeric amine synergist Genopol AB-2 was added to each of the above compositions.

| | Composition | | | | |
|---|---|---|---|---|---|
| | 1A | 2A | 3A | 4A | 5A |
| EB8808-20R | 96 | 0 | 0 | 0 | 0 |
| CN301 | 0 | 96 | 0 | 0 | 0 |
| RC300 | 0 | 0 | 96 | 0 | 0 |
| CN991 | 0 | 0 | 0 | 96 | 0 |
| BR582E8 | 0 | 0 | 0 | 0 | 96 |
| Genopol TX-2 | 2 | 2 | 2 | 2 | 2 |
| Genopol AB-2 | 2 | 2 | 2 | 2 | 2 |
| total (wt. %) | 100 | 100 | 100 | 100 | 100 |
| color | orange | light yellow | light yellow | light yellow | orange |

| | Composition | | | | |
|---|---|---|---|---|---|
| | 6A | 7A | 8A | 9A | 10A |
| Genomer 4230 | 96 | 0 | 0 | 0 | 0 |
| Genomer 1122 | 0 | 96 | 0 | 0 | 0 |

-continued

| | | | | | |
|---|---|---|---|---|---|
| SR508 | 0 | 0 | 96 | 0 | 0 |
| SR339 | 0 | 0 | 0 | 96 | 0 |
| SR 602 EO 10 BPA DA | 0 | 0 | 0 | 0 | 96 |
| Genopol TX-2 | 2 | 2 | 2 | 2 | 2 |
| Genopol AB-2 | 2 | 2 | 2 | 2 | 2 |
| total (wt. %) | 100 | 100 | 100 | 100 | 100 |
| color | | light yellow | light orange | | |

All of compositions 1A-10A were cured using 405 nm LED flood. Color was evaluated by visual appearance and recorded.

After curing all of Samples 1A-10A had a light yellow to light orange to orange color. The color surprisingly faded after storing the cured material at room temperature for 24 hrs. Further surprisingly, the color reappears when the cured sample is exposed to 405 nm light again.

Example 3

Photocurable formulations comprising the polymeric thioxanthone photoinitiator Genopol TX-2, polymeric amine synergist Genopol AB-2 and urethane acrylate oligomers and non-urethane linkage monomers were prepared. All amounts are in wt. %.

Examples 11-14 have no fillers in the composition while Example 15-18 comprise silane treated fume silica filler. All compositions were cured and color was evaluated by visual appearance at different time intervals and recorded.

| | Composition | | | |
|---|---|---|---|---|
| | 11 | 12 | 13 | 14 |
| Ebecryl 8800-20R | 50 | 0 | 0 | 0 |
| Ebecryl 8807 | 0 | 50 | 0 | 0 |
| CNN 991 | 0 | 0 | 50 | 0 |
| BR582E8 | 0 | 0 | 0 | 50 |
| SR 259 | 46 | 46 | 46 | 46 |
| Genopol TX-2 | 2 | 2 | 2 | 2 |
| Genopol AB-2 | 2 | 2 | 2 | 2 |
| total (wt. %) | 100 | 100 | 100 | 100 |

| | Visual color observation under different light curing | | | | | | | | |
|---|---|---|---|---|---|---|---|---|---|
| | Mercury arc lamp 30 s | | | LED 375 nm flood 30 s | | | LED 405 nm flood 30 s | | |
| Sample | Right after curing | 24 hs after curing | After $2^{nd}$ light exposure | Right after curing | 24 hs after curing | After $2^{nd}$ light exposure | Right after curing | 24 hs after curing | After $2^{nd}$ light exposure |
| 11 | Orange | Yellow | Yellow | Orange | Yellow | Orange | Orange | Yellow | Orange |
| 12 | Orange | Yellow | Yellow | Orange | Yellow | Orange | Orange | Yellow | Orange |
| 13 | Orange | Yellow | Yellow | Orange | Yellow | Orange | Orange | Yellow | Orange |
| 14 | Orange | Yellow | Yellow | Orange | Yellow | Orange | Orange | Yellow | Orange |

| | Composition | | | |
|---|---|---|---|---|
| | 15 | 16 | 17 | 18 |
| Ebecryl 8800-20R | 45 | 0 | 0 | 0 |
| Ebecryl 8807 | 0 | 45 | 0 | 0 |
| CNN 991 | 0 | 0 | 45 | 0 |
| BR582E8 | 0 | 0 | 0 | 45 |
| SR 259 | 46 | 46 | 46 | 46 |
| Genopol TX-2 | 2 | 2 | 2 | 2 |
| Genopol AB-2 | 2 | 2 | 2 | 2 |
| Aerosil R202 | 5 | 5 | 5 | 5 |
| total (wt. %) | 100 | 100 | 100 | 100 |

| | Visual color observation under different light curing | | | | | | | | |
|---|---|---|---|---|---|---|---|---|---|
| | Mercury arc lamp 30 s | | | LED 375 nm flood 30 s | | | LED 405 nm flood 30 s | | |
| Sample | Right after curing | 24 hs after curing | After $2^{nd}$ light exposure | Right after curing | 24 hs after curing | After $2^{nd}$ light exposure | Right after curing | 24 hs after curing | After $2^{nd}$ light exposure |
| 15 | Orange | Yellow | Yellow | Orange | Yellow | Orange | Orange | Yellow | Orange |
| 16 | Orange | Yellow | Yellow | Orange | Yellow | Orange | Orange | Yellow | Orange |
| 17 | Orange | Yellow | Yellow | Orange | Yellow | Orange | Orange | Yellow | Orange |
| 18 | Orange | Yellow | Yellow | Orange | Yellow | Orange | Orange | Yellow | Orange |

The results showed that all of the formulations comprising polymeric photoinitiator Genopol TX-2 and polymeric amine synergist Genopol AB-2 when cured under mercury arc lamp or LED lamp at 405 nm or LED lamp at 375 nm have an orange color. The orange color faded to a yellow color in all samples after storing the cured materials at room temperature for 24 hrs under the absence of UV light. For samples cured using a LED lamp at 375 nm and an LED lamp at 405 nm the orange color appeared again when the cured samples were exposed to LED 405 nm light a second time. For samples cured using a mercury arc lamp the orange color did not appear again when the cured samples were exposed to LED 405 nm light a second time.

Example 4

Photocurable acrylate formulations with different polymeric thioxanthone photoinitiators were prepared. All amounts are in wt. %. All compositions were cured using a mercury arc lamp and 405 nm LED flood. Color was evaluated by visual appearance and recorded.

| | Composition | | | |
|---|---|---|---|---|
| | 16 | C | D | E |
| Ebecryl 8807 | 45 | 45 | 45 | 45 |
| SR 259 | 46 | 46 | 46 | 46 |
| Genopol AB-2 | 2 | 2 | 2 | 2 |
| Genopol TX-2 | 2 | 0 | 0 | 0 |
| Genocure ITX | 0 | 2 | 0 | 0 |
| Omnipol ITX | 0 | 0 | 2 | 0 |
| Speedcure 7010-L | 0 | 0 | 0 | 2 |
| Aerosil R202 | 5 | 5 | 5 | 5 |
| total (wt. %) | 100 | 100 | 100 | 100 |
| Mercury arc lamp 30 s | orange | yellow | yellow | yellow |
| LED 375 nm flood 30 s | orange | yellow | yellow | yellow |
| LED 405 nm flood 30 s | orange | yellow | yellow | yellow |

Surprisingly, sample 16 using the Genopol TX-2 polymeric thioxanthone photoinitiator cured to a yellow color while comparative samples C, D and E cured to a yellow color. The yellow color in samples C, D and E did not fade after cure and did not change when exposed to UV radiation after curing.

Example 5

Color of some cured sample formulations was evaluated using L,a,b values. Each sample was cured under an LED lamp at 405 nm for 20s. L, a, b values were read right after cure and again 24 hrs after the cured samples were placed in a yellow light area and again after storage following reexposing the samples to LED light at 405 nm light for another 10s. L, a. b values for the three samples were summarized below.

| Sample | time | 16 | C | F |
|---|---|---|---|---|
| L value | Right after curing | 85.85 | 91.49 | 94.30 |
| | After 24 hrs. | 91.64 | 92.66 | 94.02 |
| | Second LED 405 nm exposure | 85.30 | 90.4 | 94.27 |
| a value | Right after curing | 1.72 | −15.69 | −0.90 |
| | After 24 hrs. | −5.10 | −11.97 | −0.86 |
| | Second LED 405 nm exposure | 3.05 | −4.29 | −0.72 |
| b value | Right after curing | 51.09 | 57.54 | 3.48 |
| | After 24 hrs. | 25.87 | 34.33 | 3.63 |
| | Second LED 405 nm exposure | 47.78 | 65.74 | 3.18 |
| visual color observation | Right after curing | orange | yellow | clear |
| | After 24 hrs. | light orange | light yellow | clear |
| | Second LED 405 nm exposure | orange | yellow | clear |

Immediately after curing sample 16 showed an orange color compared to Comparative samples C and F. which had yellow and clear appearance, respectively, after curing. The L, a, b values for each sample correspond to the visually apparent color. After 24 hrs, the cured sample 16 material showed a significant, visually apparent color change from orange to light orange, which was indicated in L, a and b values as well. After exposure of sample 16 to an LED lamp at 405 nm the color visually changed from light orange to orange, which was indicated in L, a and b values as well. Comparative compositions C and F did not show any orange color development in the tests, either visually or instrumentally.

Example 6

In this example the formulation of sample 16 was exposed to 405 nm light from an LED lamp for different times. Color was assessed visually and instrumentally immediately after the light exposure. Degree of polymerization was also measured after each exposure.

| Cure time (sec) | L value | a value | b value | visual color observed | double bond conversion (%) |
|---|---|---|---|---|---|
| 1 | 89.53 | −2.15 | 4.80 | Slight yellow | 24 |
| 2 | 89.98 | −3.44 | 7.45 | slight yellow | 50 |
| 4 | 88.68 | −6.81 | 21.59 | Light yellow | 68 |
| 6 | 87.43 | −6.7 | 29.93 | Light orange | 73 |
| 8 | 86.05 | −5.85 | 37.36 | Light orange | 79 |
| 10 | 84.86 | −4.25 | 42.51 | orange | 80 |
| 15 | 83.23 | −2.12 | 48.48 | orange | 82 |
| 20 | 82.35 | −0.49 | 51.61 | orange | 84 |

These results illustrate that both visual color observation and the instrumental L, a, b values after curing are representative of the curing time, double bond conversion and degree of cure. As the light exposure increases, the double bond conversion increases (indicating an increased polymerization of the sample) and the cured sample shows a color change from slight light yellow to light orange and orange. The color change indicates the extent of polymerization.

Example 7

A photocurable acrylate formulations comprising a polymeric thioxanthone photoinitiator was prepared. All amounts are in wt. %. All compositions were cured using an LED lamp at 405 nm, 0.844 w/$cm^2$ for 10 seconds on each side of the membrane, total energy per side: 7.85 J/$cm^2$.

| | G | 19 | H | 20 | 21 |
|---|---|---|---|---|---|
| BR582E8 | 35 | 34 | 41 | 40 | 50 |
| IBOA | 41.5 | 40 | 38 | 36 | 46 |
| SR508 | 22.5 | 22 | 20 | 20 | 0 |
| Omnirad 819 | 1 | 0 | 1 | 0 | 0 |
| Genopol TX-2 | 0 | 2 | 0 | 2 | 2 |
| Genopol AB-2 | 0 | 2 | 0 | 2 | 2 |
| total (wt. %) | 100 | 100 | 100 | 100 | 100 |
| Color change | light yellow | Orange | light yellow | orange | orange |
| Shore D hardness | 75 | 60 | 80 | 70 | 63 |
| Bend test (on BW30 membrane) | Fail | Pass | Fail | Pass | Pass |
| Viscosity (cP) at 20 s−1, 25 C. | | 730 | | | |
| Chemical Resistance - adhesion loss[1] | | Pass | | | |
| Chemical Resistance - adhesion loss[2] | | Pass | | | |

[1]Tested after soaking for 24 hours at 70° C. in an aqueous pH 10.5 solution
[2]Tested after soaking for 24 hours at 80° C. in an aqueous pH 12.5 solution Comparative samples G and H, using the phosphine oxide photoinitiator, failed the bend test and were not acceptable for a membrane fold coating. Compositions 19, 20 and 21, all comprising a polymeric thioxanthone photoinitiator and amine co-photoinitiator passed the bend test and were acceptable as a membrane fold coating.

The invention claimed is:

1. A filtration membrane, comprising:
a surface on the membrane; and
a photocurable, color changing composition disposed on at least part of the membrane surface, the composition comprising:
a. from 20 to 60 wt. % of an acrylate oligomer;
b. from 10 to 60 wt. % of a diluent;
c. a cure system comprising from 0.1 to 5 wt. % of a polymeric thioxanthone derivative photoinitiator and from 0.1 to 5 wt. % of an aromatic tertiary amine com photoinitiator;
d. optionally from 0 to 60 wt. % of a filler; and
e. optionally from 0 to 20 wt. % of one or more additives;
wherein the photocurable, color changing composition does not include phosphine oxide;
wherein the photocurable, color changing composition disposed on the surface is cured and exhibits a color change during curing, and after 24 hours of storage in the absence of UV light the color fades, while the faded composition changes color during a subsequent exposure to . . . actinic radiation, and wherein the composition after curing is a yellow to orange color.

2. The filtration membrane of claim 1 wherein the photocurable, color changing composition disposed on the surface comprises a plurality of spacers, a fold protection coating; or
both a plurality of spacers and a fold protection coating.

3. The filtration membrane of claim 1 wherein the filtration membrane is a bilayer membrane comprising a filtration layer overlying a support layer.

4. The filtration membrane of claim 1 wherein the filtration membrane comprises a polyethersulfone layer.

5. A membrane filter, comprising:
a core;
a plurality of the filtration membranes according to claim 1 attached to the core, each filtration membrane having a surface; and
the photocurable, color changing composition is disposed on at least part of the surface.

6. The membrane filter of claim 5, wherein the photocurable, color changing composition disposed on at least part of the surface is cured.

7. A membrane filter, comprising:
a core;
a plurality of the filtration membranes of claim 1 attached to the core, each filtration membrane surface defining a fold region; and
the photocurable, color changing composition is disposed on at least part of the fold region.

8. The membrane filter of claim 7, wherein the photocurable, color changing composition disposed on at least part of the fold region is cured.

9. A method of forming topographical features on a membrane surface comprising:
providing a membrane surface;
providing a stencil or screen over the membrane surface, the stencil or screen having openings exposing the membrane surface for receiving a curable composition;
providing a light curable color changing composition, comprising:
a. from 20 to 60 wt. % of an acrylate oligomer;
b. from 10 to 60 wt. % of a diluent;
c. a cure system comprising from 0.1 to 5 wt. % of a polymeric thioxanthone derivative photoinitiator and
from 0.1 to 5 wt. % of an aromatic tertiary amine co-photoinitiator;
d. optionally from 0 to 60 wt. % of a filler; and
e. optionally from 0 to 20 wt. % of one or more additives;
wherein the curable composition does not include phosphine oxide;
wherein the curable composition exhibits
a color change during curing;
depositing one or more layers of the curable composition into the stencil openings or screen openings and onto the membrane surface to form the topographical features, the openings defining an approximate shape and size of the topographical features;

removing the stencil or screen to leave in place the topographical features on the membrane; and exposing the curable composition to actinic radiation to cure the composition, wherein a single layer of the curable composition deposited in the depositing step produces topographical features have an aspect ratio (height/width) from about 0.2 to about 2.

10. The method of claim 9, further comprising storing the membrane and cured feature in the absence of UV radiation, wherein the cured feature changes color during storage;

exposing the membrane and cured feature to actinic radiation, wherein the cured feature changes color; and evaluating the degree of cure of the cured feature by the color of the cured feature after exposure to actinic radiation.

11. A method of checking the cure of a polymer based feature on a filtration membrane, comprising:

providing a membrane have a surface;

providing a light curable color changing composition, comprising:

from 20 to 60 wt. % of an acrylate oligomer;

from 10 to 60 wt. % of a diluent;

a cure system comprising from 0.1 to 5 wt. % of a polymeric thioxanthone derivative photoinitiator and from 0.1 to 5 wt. % of an aromatic tertiary amine co-photoinitiator;

optionally from 0 to 60 wt. % of a filler; and optionally from 0 to 20 wt. % of one or more additives;

wherein the composition does not include phosphine oxide;

coating the composition on a portion of the membrane surface; and exposing the coated composition to actinic radiation to cure the coated composition and form the cured feature, wherein the composition changes color during curing; and evaluating the degree of cure of the cured composition by the color of the composition.

* * * * *